(12) United States Patent
Nakamura

(10) Patent No.: US 6,985,692 B2
(45) Date of Patent: Jan. 10, 2006

(54) IMAGE READING APPARATUS AND IMAGE FORMING APPARATUS PROVIDED WITH THE SAME

(75) Inventor: Fumihiko Nakamura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/671,617

(22) Filed: Sep. 29, 2003

(65) Prior Publication Data

US 2004/0081495 A1 Apr. 29, 2004

(30) Foreign Application Priority Data

Oct. 15, 2002 (JP) ........................................ 2002-301147

(51) Int. Cl.
*G03G 15/00* (2006.01)

(52) U.S. Cl. ....................................... 399/367; 399/371
(58) Field of Classification Search ................. 399/367, 399/369, 371, 361, 362
See application file for complete search history.

(56) References Cited

U.S. PATENT DOCUMENTS

| 5,819,152 | A | * | 10/1998 | Kobayashi et al. | ......... | 399/367 |
|---|---|---|---|---|---|---|
| 6,285,582 | B1 | * | 9/2001 | Lin | ............................. | 365/175 |
| 6,618,575 | B2 | * | 9/2003 | Takida et al. | ............... | 399/367 |
| 6,859,637 | B2 | * | 2/2005 | Kawai | ........................ | 399/367 |
| 6,934,501 | B2 | * | 8/2005 | Kawai et al. | ............... | 399/367 |
| 2001/0014234 | A1 | * | 8/2001 | Kono | ......................... | 399/370 |

FOREIGN PATENT DOCUMENTS

| JP | 2000038234 | 2/2000 |
|---|---|---|
| JP | 2002-084424 | 3/2002 |

\* cited by examiner

*Primary Examiner*—Anthony H. Nguyen
(74) *Attorney, Agent, or Firm*—Fitzpatrick, Cella, Harper & Scinto

(57) ABSTRACT

An image reading apparatus is adapted to nip a sheet having an image formed thereon with a main roller and conveying rollers, the conveying rollers being in contact with this main roller, to convey the sheet along the main roller to a reading line opposed to a lowermost point of the main roller, and to read the image with an image sensor for reading an image, and includes reading white background plates which press the sheet against the reading line on both sides of the main roller.

11 Claims, 8 Drawing Sheets

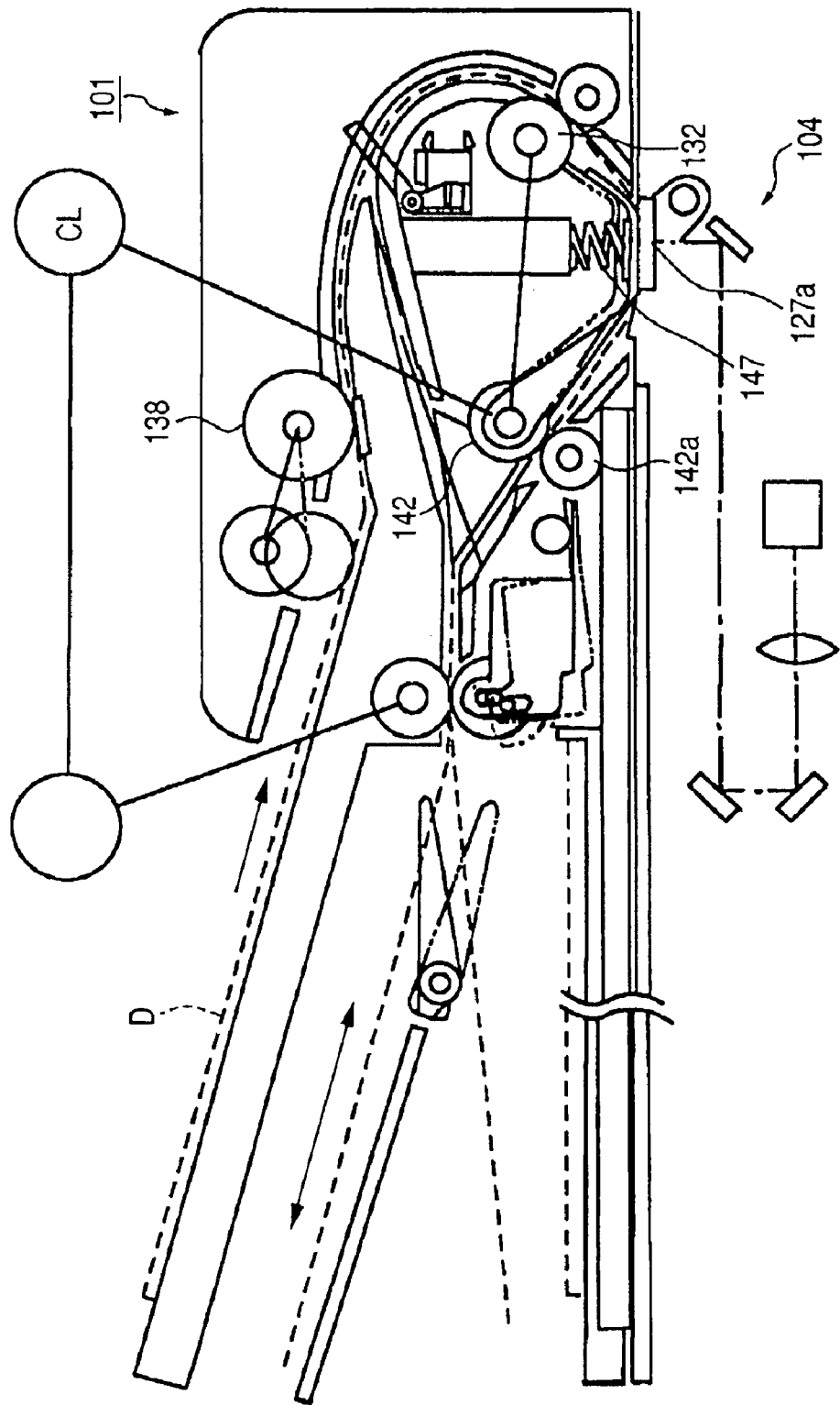

IMAGE READING APPARATUS AND IMAGE FORMING APPARATUS PROVIDED WITH THE SAME

BACKGROUND OF THE INVENTION

1. Field of the Invention

The present invention relates to an image reading apparatus for reading an image formed on a sheet, and in particular to an image reading apparatus which is capable of reading an image up to a trailing edge of a sheet in an image reading position of the sheet, and an image forming apparatus provided with the same.

2. Related Background Art

Conventionally, as shown in FIG. 8, examples of an image reading apparatus include one adapted to convey a sheet having an image formed thereon (hereinafter referred to as "original") D with a pre-reading roller 132, a post-reading roller 142, and the like, which are arranged along a conveying direction of the original D, and to read the image on the original D with an original reading portion 104 in an image reading position 127a in the course of conveyance of the original D (e.g., see Japanese Patent Application Laid-Open No. 2000-038234). Then, this image reading apparatus 101 is adapted to read the original D while pressing the original D against the image reading position 127a with a biasing member 147 such that the original D does not lift in the image reading position 127a.

However, the conventional image reading apparatus disclosed in Japanese Patent Application Laid-Open No. 2000-038234 has the following problems which should be solved.

The pre-reading roller 132 and the post-reading roller 142 are provided as rollers for conveying the original D on the upstream side and the downstream side of the original conveying direction of the image reading position 127a. An original conveying form of the pre-reading roller 132 and the post-reading roller 142 in such an original conveying mechanism is as described below.

That is, the original D is conveyed only by the pre-reading roller 132 until a leading edge of the original D reaches the post-reading roller 142. Then, when the leading edge of the original D has reached the post-reading roller 142, the original D is conveyed by the pre-reading roller 132 and the post-reading roller 142. Finally, after a trailing edge of the original D comes out of the pre-reading roller 132, the original D is conveyed by the post-reading roller 142 until the original D is discharged. Note that in the series of operations, for simplification of explanation, it is assumed that a separation roller 138, which separates the originals D one by one and conveying the originals D to the pre-reading roller 132, does not contribute to conveyance of the originals D.

In addition, a main conveyance roller for mainly conveying the original D is often one of the pre-reading roller 132 and the post-reading roller 142. Usually, the pre-reading roller 132 is adapted to function as the main conveyance roller.

In this case, original conveying forces of the pre-reading roller 132 and the post-reading roller 142 are in a relation in which the original conveying force of the pre-reading roller 132 is larger than the original conveying force of the post-reading roller 142.

Note that the original conveying force of the pre-reading roller 132 depends upon a force of nipping the original D, friction with the original D, and the like of the pre-reading roller 132 and a roller 132a. In addition, the original conveying force of the post-reading roller 142 depends upon a force of nipping the original D, friction with the original D, and the like of the post-reading roller 142 and a roller 142a.

In addition, a slight fluctuation in a dimension (usually, approximately ±0.04 mm, and, even if importance is placed on accuracy, approximately ±0.02 mm) may occur in an external dimension, which affects a conveying amount of an original, when the pre-reading roller 132 and the post-reading roller 142 are manufactured.

Therefore, it is difficult to make conveying amounts of the original of the pre-reading roller 132 and the post-reading roller 142 identical to each other.

Thus, the conveying amount of the original of the pre-reading roller 132 and the post-reading roller 142 are in a relation in which the conveying amount of the original of the pre-reading roller 132 is equal to or smaller than the conveying amount of the original of the post-reading roller 142.

According to such a relation, after the leading edge of the original has reached the post-reading roller 142, the image reading apparatus 101 conveys the original D with the pre-reading roller 132 and the post-reading roller 142 while sliding the post-reading roller 142 against the original D, and always pulling the original D to bring the original D into close contact with reading means.

Consequently, when the trailing edge of the original D comes out of the pre-reading roller 132 after the pre-reading roller 132 and the post-reading roller 142 has rotated several times, conveying load of the post-reading roller 142 slidingly conveying the original D is released all at once. In an instance when the conveying load is released, the post-reading roller 142 may convey the original D with a conveying amount exceeding a predetermining conveying amount.

As described above, it is likely that the conventional image reading apparatus 101 causes unevenness of conveyance among the originals D.

As a result, in the image reading apparatus 101, original conveying accuracy declines markedly, an image in original reading is deteriorated markedly, and original reading accuracy also declines.

In particular, with a scanner function, an image read once can be enlarged by several times to be shown on a monitor by a personal computer (PC). Therefore, the read image can be identified in a unit of one pixel. Thus, degradation of quality of the read image may be seen conspicuously.

As a measure to solve such a problem, it is possible to end reading of the original D while the original D is conveyed by the pre-reading roller 132 and the post-reading roller 142 before the original D comes out of the pre-reading roller 132. However, in this case, another problem occurs in that the image cannot be read surely up to the trailing edge of the original D.

SUMMARY OF THE INVENTION

It is an object of the present invention to provide an image reading apparatus which is capable of reading an image up to a trailing edge of a sheet in an image reading position of an original.

In order to attain the above-mentioned object, according to one aspect of the present invention, there is provided an image reading apparatus having a structure in which a sheet having an image formed thereon is nipped with a conveying rotary member and biasing rotary members, the biasing rotary members being in contact with the conveying rotary member, and conveys the sheet along the conveying rotary member, and conveys the sheet to an image reading position opposed to a lowermost point of the conveying rotary member to read the image with reading means which reads an image, the image reading apparatus including pressing means which are arranged in an axial direction of the conveying rotary member for pressing the sheet against the image reading position, in which a tread of the conveying rotary member and surfaces of the pressing means opposed to the reading means are colored white.

In further aspect of the image reading apparatus, the pressing means are arranged on both sides in the axial direction of the conveying rotary member.

In further aspect of the image reading apparatus, the pressing means have a guide surface which guides the sheet.

In further aspect of the image reading apparatus, the pressing means are pressed against the image reading position by biasing means.

In further aspect of the image reading apparatus, the pressing means are formed of an elastic member.

In further aspect of the image reading apparatus, the biasing rotary members are disposed on an upstream side and a downstream side of the image reading position, respectively.

In further aspect of the image reading apparatus, the biasing rotary member on the upstream side has a diameter smaller than a diameter of the biasing rotary member on the downstream side.

The image reading apparatus according to further aspect of the present invention includes:

a sheet-like original reading mechanism which has the conveying rotary member, the biasing rotary members, the pressing means, the reading means, a sheet glass which is disposed in the image reading position and an upper surface of which the sheet passes, and discharge means which discharges the sheet conveyed by the conveying rotary member and the biasing rotary member; and a book-like original reading mechanism which has a platen glass, on which a book-like original is mounted, and a platen bringing the book-like original into close contact with the platen glass, and is capable of reading the book-like original as the reading means moves under the platen glass.

In further aspect of the image reading apparatus, the platen has a discharged sheet stacking section, on which a sheet discharged by the discharge means is stacked, on an upper surface thereof.

The image reading apparatus according to further aspect of the present invention includes:

sheet stacking means on which a sheet having an image formed thereon is stacked;

sheet conveying means which conveys sheets on the sheet stacking means; and separation means which separates the sheets conveyed by the sheet conveying means one by one.

In further aspect of the image reading apparatus, the separation means includes a separation roller and a friction member which nip to separate the sheets one by one.

Further, according to another aspect of the present invention, there is provided an image forming apparatus including:

an image reading apparatus which reads an image formed on a sheet; and image forming means which forms the image read by the image reading apparatus on a sheet, in which the image reading apparatus is the image reading apparatus according to any one of the aspects described above.

As described above, in the image reading apparatus of the present invention, a sheet is pressed against the image reading position by the pressing means, it is thus possible to improve reading accuracy of an image on an original by preventing lifting of the original surely.

In addition, in the image reading apparatus of the present invention, a sheet is pressed against the image reading position by the pressing means until the trailing edge of the sheet passes there, and therefore an image on the sheet can be read surely.

Moreover, since the image reading apparatus of the present invention is constituted without using a large number of rotary members, it is possible to reduce an external dimension of the apparatus to reduce cost. In addition, it is possible to always keep an original conveying speed at the image reading position constant to improve quality of a read image. Furthermore, ease of use of the image reading apparatus can be improved.

Further, since the pressing means and the peripheral surface of the conveying rotary member are colored white, the white color is caused to function as a background color at the time of original reading to prevent offset.

BRIEF DESCRIPTION OF THE DRAWINGS

FIG. 8 is a front sectional view of a conventional image reading apparatus.

DESCRIPTION OF THE PREFERRED EMBODIMENT

Figure 1:
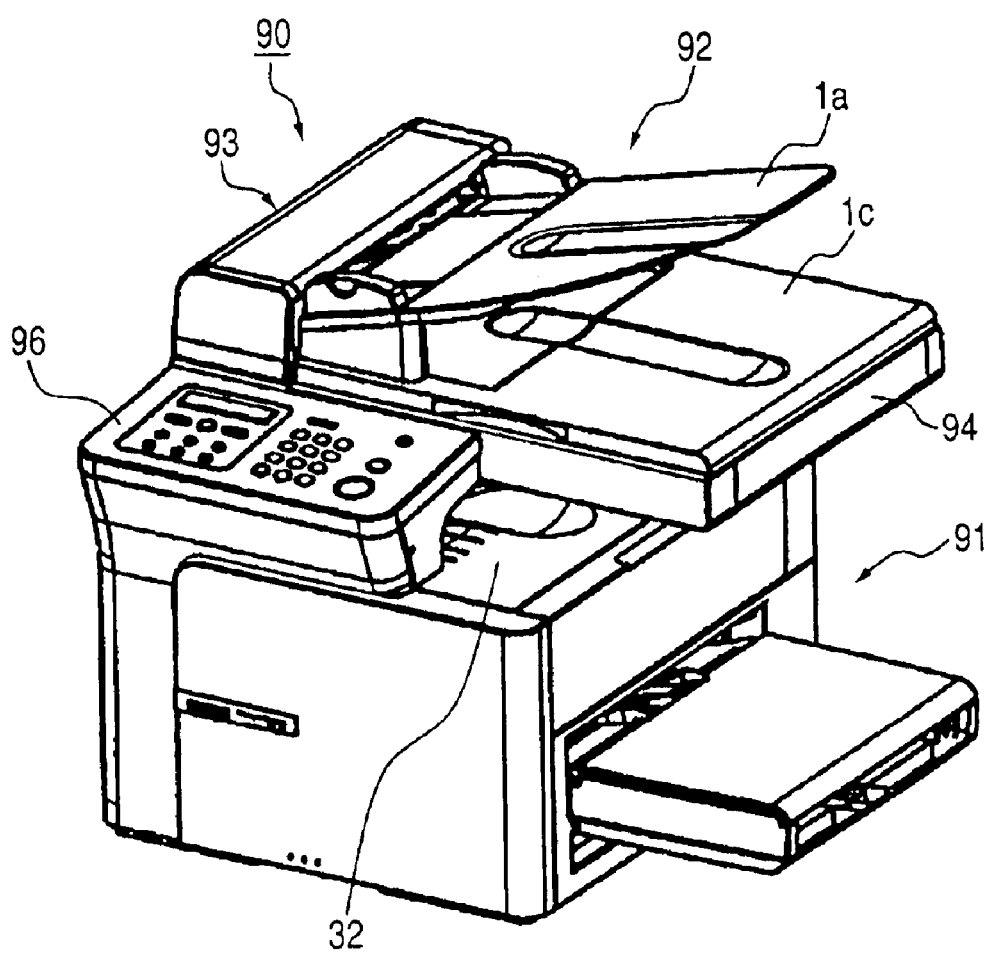
FIG. 1 is an external perspective view of a copying machine which is an example of an image forming apparatus provided with an image reading apparatus of an embodiment of the present invention in a main body thereof.

Hereinafter, an image reading apparatus of an embodiment of the present invention will be described with reference to the accompanying drawings. In addition, an image forming apparatus provided with the image reading apparatus of this embodiment in a main body of the image forming apparatus will also be described with reference to the accompanying drawings.

The image forming apparatus is adapted to form an image on a sheet. As the image forming apparatus, there are a facsimile, a printer, a composite machine thereof, and the like in addition to a copying machine. The image reading apparatus of this embodiment is provided in an apparatus main body of a digital copying machine provided with a printer function, which is an example of the image forming apparatus. However, the image reading apparatus is not provided only in the copying machine.

Note that, in this embodiment, a sheet having an image formed thereon is referred to as an "original", which is denoted by reference character D. In addition, a sheet on which an image is to be formed is referred to as a "recording paper", which is denoted by reference character P. Although the image reading apparatus can also read a book as well as an original, a case in which the image reading apparatus reads an original will be mainly described.

(Copying Machine)

Figure 2:
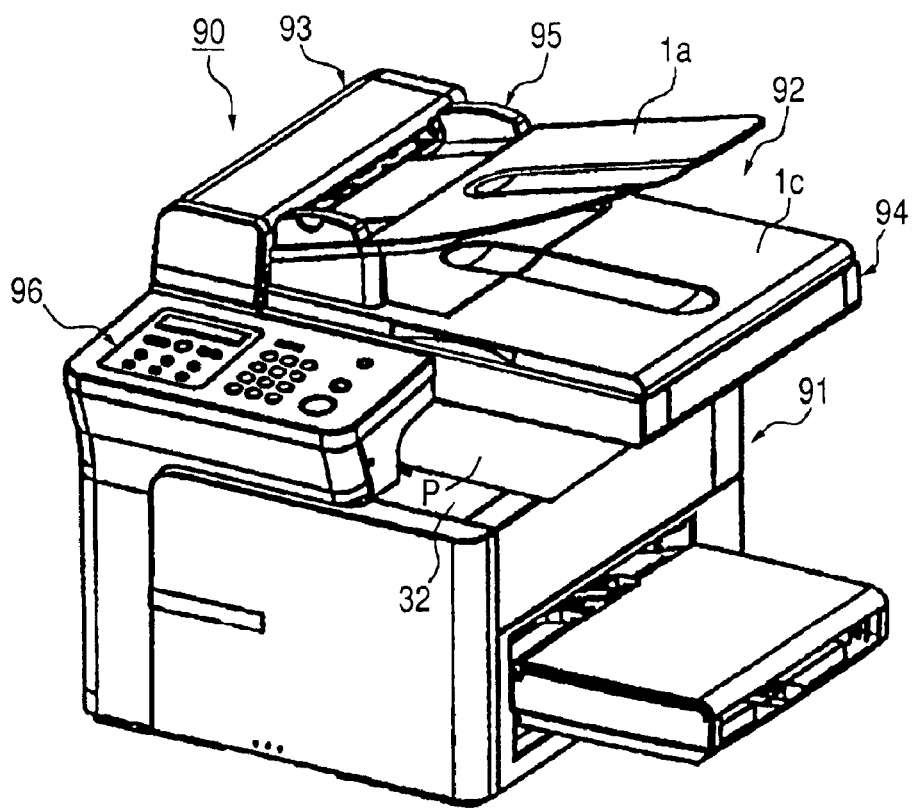
FIG. 2 is a view of a state in which a sheet having an image formed thereon is discharged in the copying machine shown in FIG. 1.
Figure 3:
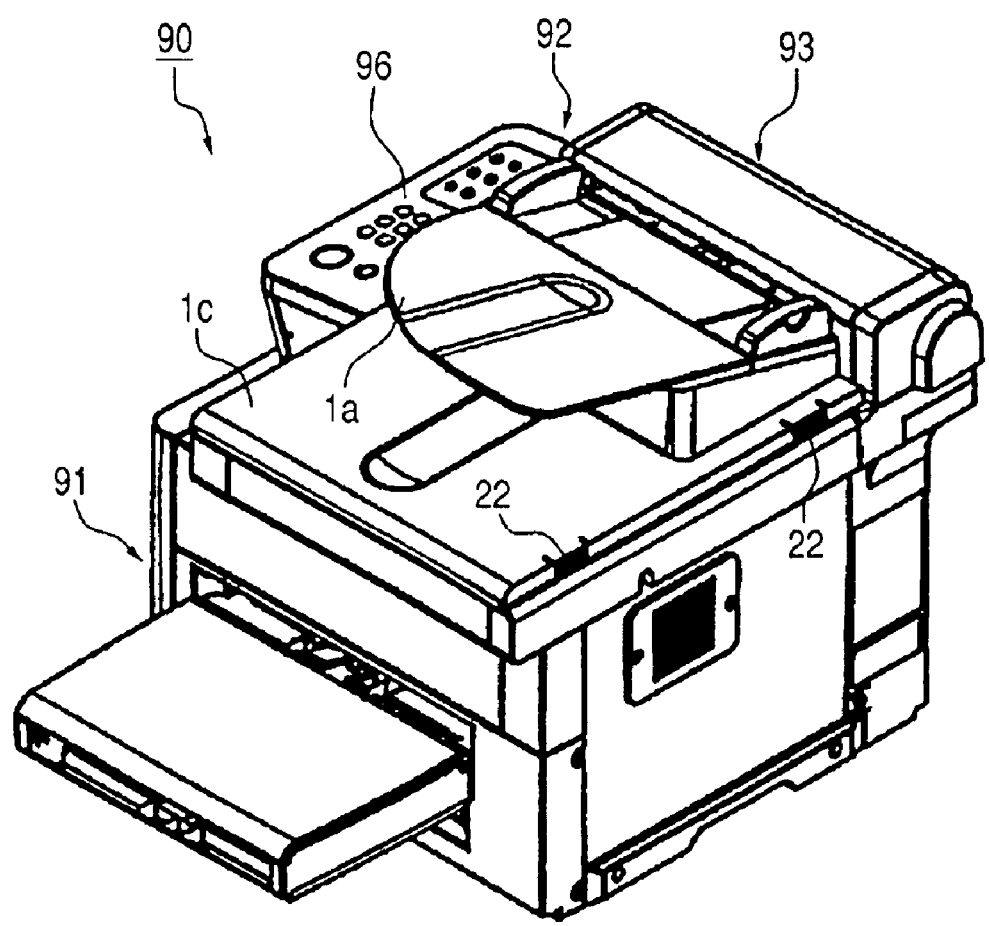
FIG. 3 is a view of the copying machine shown in FIG. 1 viewed from a backside thereof.
Figure 4:
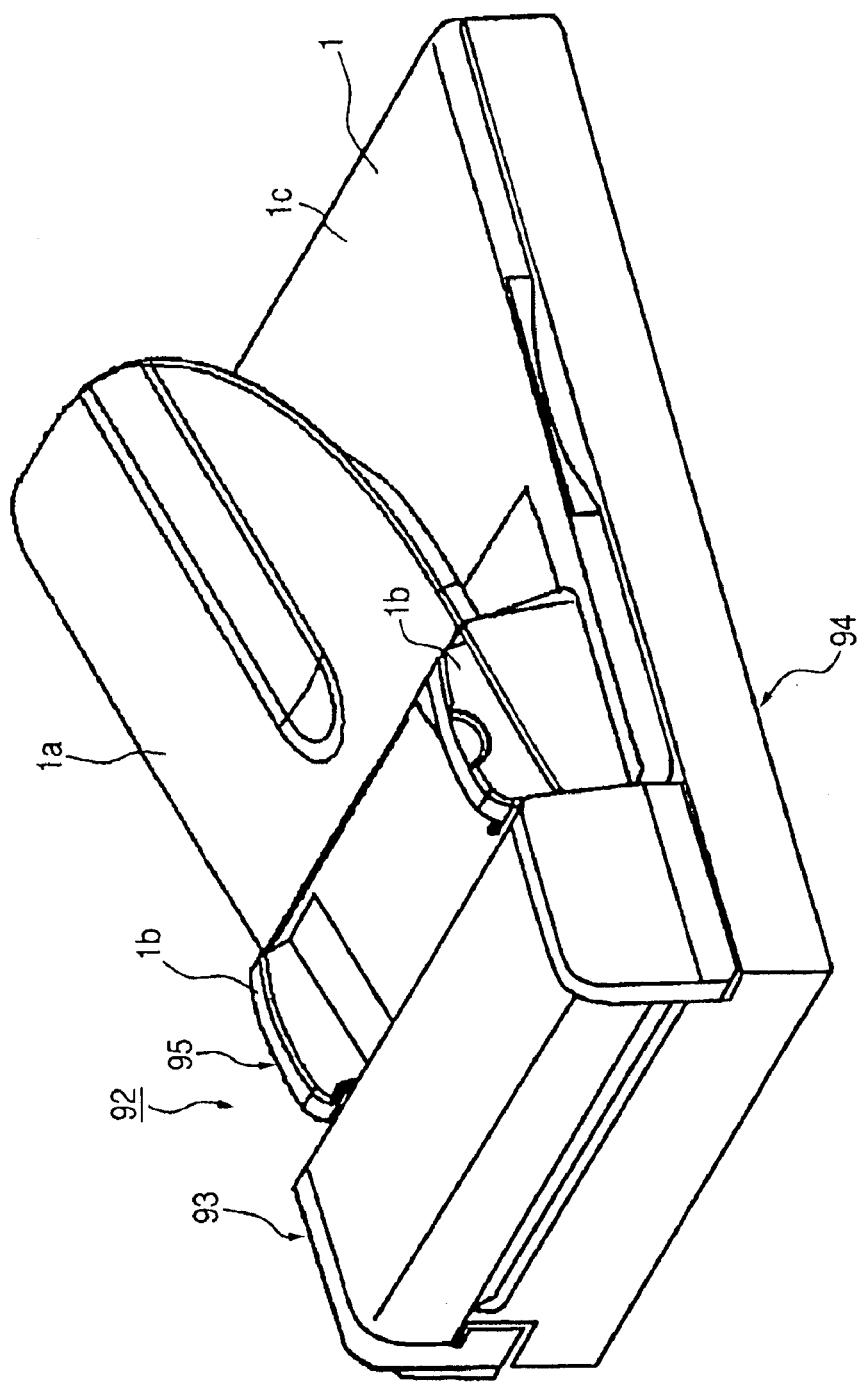
FIG. 4 is an external perspective view of the image reading apparatus in the embodiment of the present invention.
Figure 5:
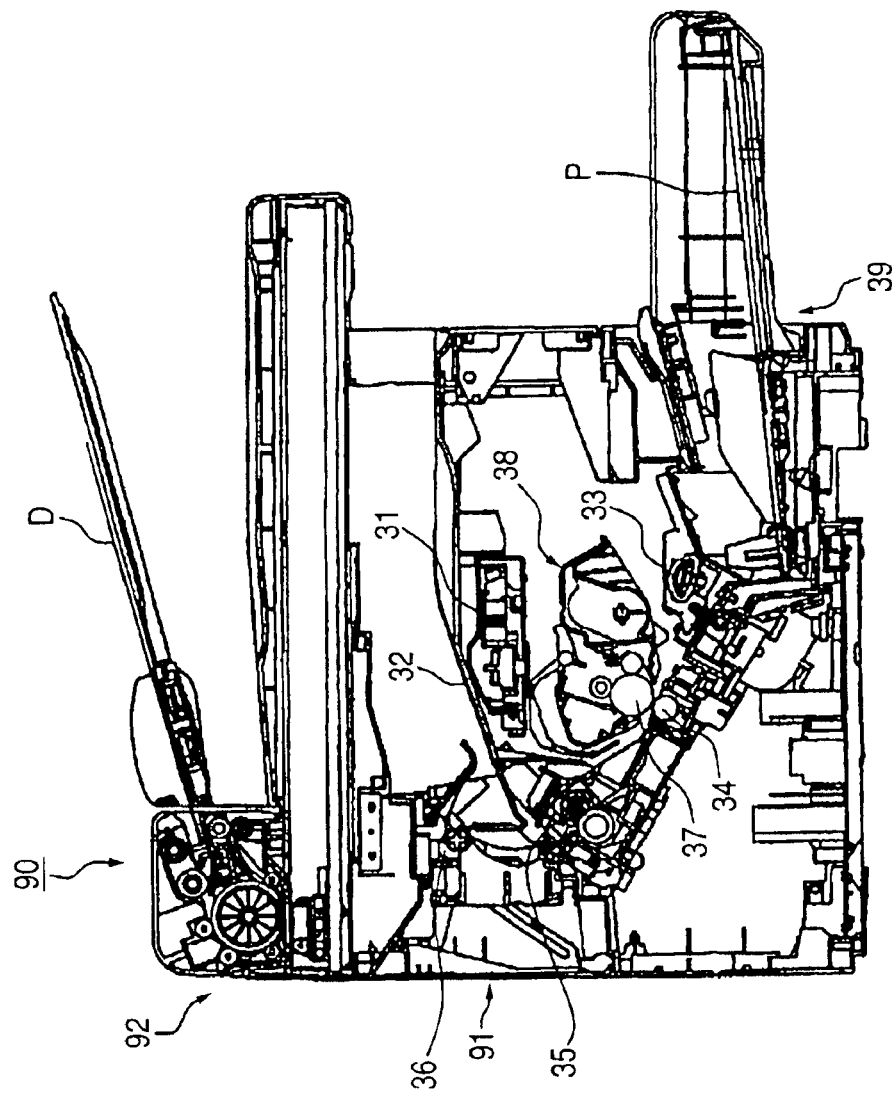
FIG. 5 is a sectional view along a conveying direction of recording paper of the copying machine shown in FIG. 1.

FIGS. 1 to 3 are external perspective views of a copying machine. FIG. 4 is a perspective view of the image reading apparatus. FIG. 5 is a sectional view along a conveying direction of recording paper of the copying machine shown in FIG. 1.

A copying machine 90 has an image reading apparatus 92 above an image reading apparatus 91 serving also as an apparatus main body. The copying machine 90 is adapted to record image information, which is read by the image reading apparatus 92, on the recording paper P as an image with the image recording apparatus 91 in the case of a copy mode, and to record image data from the outside on the recording paper P as an image with the image recording apparatus 91 in the case of a print mode.

As shown in FIG. 5, the image recording apparatus 91 irradiates a photosensitive drum 37 serving as an image bearing member with a laser beam from an optical system 31, which is based upon image information read from the original D in the image reading apparatus 92 or image information sent from the outside, to form an electrostatic latent image on the photosensitive drum 37. Then, in an image forming portion serving as image forming means, which is constituted in a form of a cartridge such as a process cartridge 38, the image recording apparatus 91 develops the electrostatic latent image formed on the photosensitive drum 37 with a developer (toner) to form a toner image.

In the meantime, in synchronization with the formation of the toner image, the image recording apparatus 91 conveys the recording paper P with a recording paper supply portion 39, which is disposed at the bottom of the image recording apparatus 91, and a conveying portion 33, and supplies the recording paper P to an image forming portion of the process cartridge 38. A transfer device 34 transfers the toner image on the photosensitive drum 37 to the recording paper P. Then, a fixing device 35 pressurizes and heats the recording paper P to fix the toner image on the recording paper P. Finally, the recording paper P is discharged to a tray 32 by a sheet discharge roller 36.

(Image Reading Apparatus)

An image reading apparatus will be described with reference to FIGS. 5 to 7.

The image reading apparatus 92 includes an original reading/conveying portion 93, a reading portion unit 94, and an original slider unit 95. The reading portion unit 94 includes a platen glass 3 on which the original D or an opened book can be mounted, a sheet glass 4 on which the original D passes automatically, and reading means such as a close contact type image sensor 5 (in this embodiment, a close contact type image sensor is used). The original slider unit 95 is a portion where a user arranges to mount originals.

A platen white background plate 2, which brings the original D into close contact with the platen glass 3 when a user mounted the original D on the platen glass 3, is attached to a lower surface of an original platen 1. The original slider unit 95, which is provided with the original platen 1 and the platen white background plate 2, is provided in the reading portion unit 94 so as to be able to rotate with a hinge 22 (see FIG. 3) as a rotation center to open an upper surface of the platen glass 3, and place the original D or the opened book on the upper surface of the platen glass 3.

An original mounting stand 1a on which plural originals D can be mounted is provided above the original platen 1. A pair of movable sliders 1b is provided to the original mounting stand 1a along a direction perpendicular to a conveying direction of the original D (width direction of the original D). The user can arrange both ends of the original D, which is placed on the original mounting stand 1a, by moving the slider 1b.

Provided in the original reading/conveying portion 93 is, for example, a U-turn path 7, which is an original conveying path of substantially a U shape identical with an arc of a main roller 6 serving as a conveying rotary member. Attached to this U-turn path 7 are, a separation roller 9 and a separation pat 10, an original presence/absence sensor 11 which detects the presence or absence of the original D, the main roller 6 for conveying the original D and opposed biasing rotary members such as rollers 16, 17, 18, and 19, discharge means such as a sheet discharge roller 12 and an opposed roller 12a, a not-shown original edge sensor for detecting a leading edge and a trailing edge of the original D, and the like. Diameters B2, B3, B4, and B5 of the rollers 16, 17, 18, and 19 are set smaller than a diameter B1 of the main roller 6.

The U-turn path 7 is formed of an external peripheral original guide 20, which forms an external periphery from the conveying roller 16 to the sheet discharge roller 12, and an internal peripheral guide 21, which forms an internal periphery from the conveying roller 16 to the sheet discharge roller 12. A part of the internal peripheral original guide 21 along the main roller 6 is formed in an arc smaller than that of the main roller 6 so as not to be an obstacle to conveyance of the original D by the main roller 6.

The close contact type image sensor 5, which is arranged on the opposite side of the original reading/conveying portion 93 via the platen glass 3 and the sheet glass 4 (arranged below the platen glass 3 and the sheet glass 4), is adapted to irradiate an image information surface of the original D with light from an LED array serving as a light source, to focus reflected light, which is reflected on the image information surface, on a sensor element with a SELFOC lens (trademark), and to read image information on the image information surface.

Figure 6:
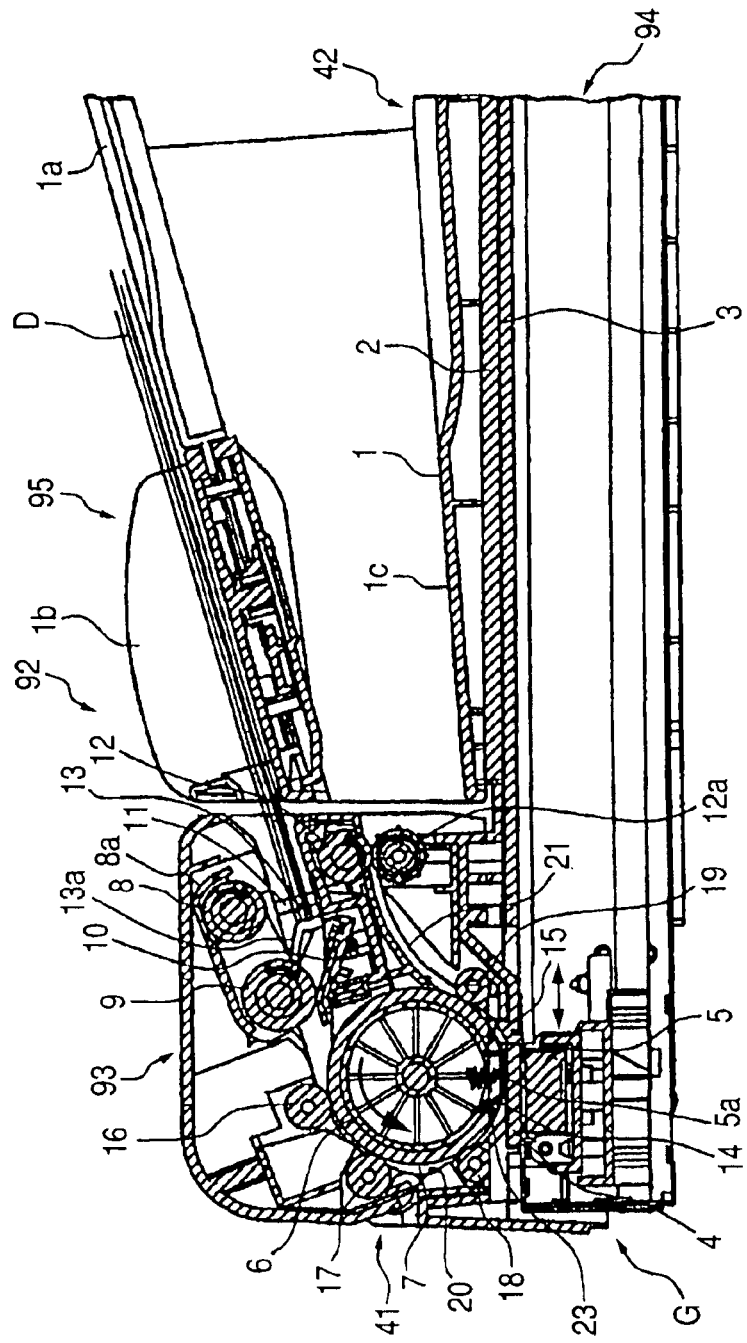
FIG. 6 is a partly enlarged view of the image reading apparatus of the copying machine in FIG. 5.
Figure 7:
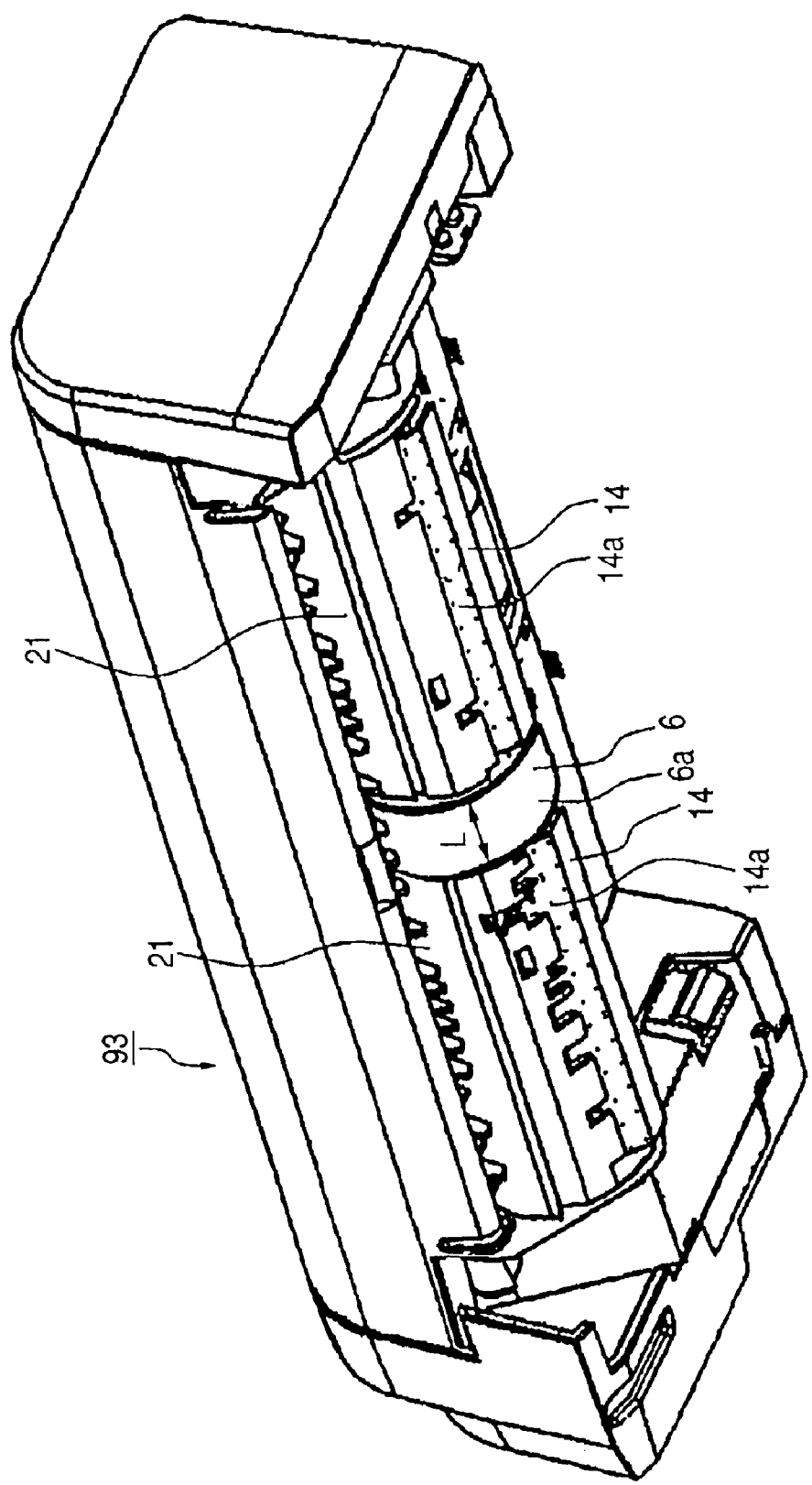
FIG. 7 is a perspective view of an original reading/conveying portion viewed from a direction of an arrow G shown in FIG. 6, in which a part of components are not shown.

This close contact type image sensor 5 is adapted to move in a direction of an arrow A shown in FIG. 6 (horizontal direction of FIG. 6). The close contact type image sensor 5 is adapted to, in reading the original D or the opened book placed on the platen glass 3 mounted by the user, scan the part below the platen glass 3 on the right side of FIG. 6 to read information on the original D or the book. In addition, the close contact type image sensor 5 is adapted to, in reading the original D in the original reading/conveying portion 93, that is, in reading the original D automatically sent to the sheet glass 4, stop at a reading position such as a reading line 5a to sequentially read the originals D to be conveyed one after another.

The user sets the original D on the original mounting stand 1a of the original reading/conveying portion 93 from the right side of the original mounting stand 1a with a read image surface of the original D facing upward. Then, the leading edge of the original D is received by an original stopper 13. In addition, the original presence/absence sensor 11 detects that the original D has been mounted on the original mounting stand 1a.

Then, when the user instructs to read an image from an operating portion 96 shown in FIG. 1, a not-shown drive portion starts, and the original stopper 13 is pushed down by a pickup arm 8a. A pickup roller 8 feeds the original D to the inside of the U-turn path 7. At this point, the original D passes an inclined surface 13a on the original stopper 13. In addition, when the originals D are supplied from the original mounting stand 1a in an overlapped state, the separation roller 9 cooperates with a friction member such as the separation pat 10 to separate the originals D one by one, and conveys the originals D sequentially from the one at the top to the U-turn path 7. The separation roller 9 and the separation pat 10 are examples of separation means.

In the above-mentioned structure, the main roller 6, the upstream conveying roller 17, the pre-reading conveying roller 18, the post-reading conveying roller 19, the close contact type image sensor 5, the sheet glass 4, the sheet discharge roller 12, the opposed roller 12a, and the like shown in FIG. 6 constitute a sheet-like original reading mechanism 41 for reading a sheet-like original. In this mechanism, the part of the main roller 6, the upstream conveying roller 17, and the sheet discharge roller 12 is adapted so as to be rotatable to the left in FIG. 6 leaving the pre-reading conveying roller 18, the post-reading conveying roller 19, the close contact type image sensor 5, the sheet glass 4, and the opposed roller 12a behind. When the part is rotated to the left, the sheet glass 4 is opened to make it possible to perform sheet jam treatment.

The original slider unit 95 provided with the original platen 1 and the platen white background plate 2, the platen glass 3, the close contact type image sensor 5, and the like constitute a book-like original reading mechanism 42 in which an image sensor moves below the platen glass 3 to read the original D or the opened book mounted on the platen glass 3. The original slider unit 95 is adapted to be rotated by the hinge 22 (see FIG. 3) to be able to open the platen glass 3. Note that the original slider unit 95 is adapted to rotate separately from the sheet-like original reading mechanism 41.

The separated original D is conveyed along the U-turn path 7 by the main roller 6, the upstream conveying roller 16 and the upstream conveying roller 17, and the pre-reading conveying roller 18, and is further conveyed to the reading line 5a of the close contact type image sensor 5 located immediately below the sheet glass 4.

When the leading edge of the original D is detected by a not-shown original edge sensor, reading of image information of the original D is started by the close contact type image sensor 5 in a position to which the original D is conveyed by a predetermined amount from a position where the leading edge of the original D is detected. At that point, the original D has already been fed to substantially the lowermost point of the main roller 6, and a part of the original D other than an axial length of the main roller 6 pressed by the main roller 6 is pressed by pressing means such as a pair of reading white background plates 14, which are located on both sides in the length direction (axial direction) of the main roller 6, to be read. Since the pair of reading white background plates 14 are arranged on both sides in the axial direction of the main roller 6, the original D can be pressed against the sheet glass 4 over the entire reading width to prevent lifting of the original D.

Here, next, the main roller 6 and the pair of reading white background plate 14, which are the most characteristic parts of the present invention will be described with reference to FIGS. 6 and 7. FIG. 7 is a perspective view of the original reading/conveying portion 93 viewed from a direction of an arrow G shown in FIG. 6, in which a part of components are not shown.

The original D is conveyed on the sheet glass 4 by the rotation of the main roller 6 while being pressed against the sheet glass 4 by the main roller 6. At this point, the pair of reading white background plates 14 are pushed by biasing means such as a spring 23 to press the original D against the sheet glass 4 such that the original D does not lift from the sheet glass 4. A pressing force of this spring 23 is a force in a degree of not reducing a conveying speed of the original D. With the above-mentioned structure, lifting of the original D can be prevented to read an image on the original D surely.

Note that instead of providing the spring 23, it is also possible to form the reading white background plates 14 with an elastic member or the like and to impart elasticity to the reading white background plates 14 themselves to press the original D to the sheet glass 4 by means of the elasticity. Lifting of the original D can be prevented by the elasticity inherent in the reading white background plates 14 to read an image on the original D surely.

In addition, in the reading white background plates 14, a guide surface 14a substantially along an arc surface of the main roller 6 is formed such that the original D can be guided smoothly. The original D can be read smoothly by the guide surface 14a guiding the original D to the reading line 5a.

A length (L) along the axial direction of the main roller 6 is set shorter than a length in a direction crossing the conveying direction of the original D (width of the original D). Consequently, the main roller 6 is adapted to come into contact with only a central part of the original D (in this embodiment, approximately 20 mm wide) rather than the entire reading width of the original D. Then, the reading white background plates 14 are provided on both sides of the main roller 6 so as to nip the main roller 6. The reading white background plates 14 are adapted to come into contact with an area other than the part where the main roller 6 is in contact with the original D.

A not-shown white reference sheet stuck on the platen glass 3 is detected by the close contact type image sensor 5 arranged below the platen glass 3 to adopt a white reference. Then, at least a surface of the reading white background plates 14 opposed to the close contact type image sensor 5 is colored white to cause the color to function as a background color at the time of reading the original D to prevent offset. A peripheral surface 6a of the main roller 6 is also colored white. As described above, the reading white background plates 14 are provided with the function of pressing the original D to bring the original D into close contact with the sheet glass 4 and the function as a conveyance guide for guiding the original D.

When the original D has passed the reading line 5a and the image thereon is started to be read by the close contact type image sensor 5, the original D is picked up by a slope member 15 provided on the downstream side of the sheet glass 4, conveyed by the main roller 6 and the post-reading conveying roller 19, and is fed to a part between the sheet discharge roller 12 and the opposed roller 12a.

In this case, the original reading/conveying portion 93 is adapted to press the original D against the main roller 6 with the respective rollers 16, 17, 18, and 19 to convey the original D with the main roller 6. Thus, the image reading apparatus 92 of this embodiment has a characteristic in that the original D passing the reading line 5*a*, that is, the original D being read is always conveyed at a uniform speed.

In addition, the diameters of the pre-reading conveying roller 18 and the post-reading conveying roller 19 are set as small as possible to be smaller than the diameters of the upstream conveying rollers 16 and 17. Therefore, the pre-reading conveying roller 18 and the post-reading conveying roller 19 can be brought as close as possible to the reading line 5*a* existing on the sheet glass 4. As a result, since the image reading apparatus 92 of this embodiment presses the original D against the main roller 6 in the vicinity of the reading line 5*a* with the pre-reading conveying roller 18 and the post-reading conveying roller 19, the original D can be pressed against the main roller 6 for a longer period of time than that in the past, the play of the original D is reduced, and reading accuracy of an image on the original D can be improved.

In addition, since the pre-reading conveying roller 18 presses the original D against the main roller 6 for a long period of time, the image on the original D can be read up to the very trailing edge of the original D without decreasing the reading accuracy of the image on the original D.

Note that, even if only the diameter B4 of the pre-reading conveying roller 18 is set small, since the pre-reading conveying roller 18 presses the original D against the main roller 6 for a long period of time, the image on the original D can be read up to the very trailing edge of the original D without decreasing the reading accuracy of the image on the original D.

In addition, if the diameters of the pre-reading conveying roller 18 and the post-reading conveying roller 19 are set the same, since pre-reading conveying roller 18 and the post-reading conveying roller 19 rotate at the same rotating speed with respect to the main roller 6, the original D is conveyed smoothly. Further, if the diameters of the pre-reading conveying roller 18 and the post-reading conveying roller 19 are set different, the pre-reading conveying roller 18 and the post-reading conveying roller 19 can be brought close to the reading line 5*a* in accordance with a structure around the rollers. In particular, if the diameter of the pre-reading conveying roller 18 is set smaller than the diameter of the post-reading conveying roller 19, the pre-reading conveying roller 18 can be brought as close as possible to the reading line 5*a*. Thus, it becomes possible to bring the trailing edge of the original D into pressed-contact against the main roller 6, and the reading accuracy of the original D can be improved.

Then, when the trailing edge of the original D is detected by the not-shown original edge sensor, the image reading apparatus 92 ends the reading of image information with the close contact type image sensor 5 at a position to which the original D is conveyed by a predetermined amount from the position where the trailing edge of the original D is detected. The original D is discharged to a discharged sheet stacking section such as an upper surface 1*c* of the original platen 1 also serving as an original discharge stand by the sheet discharge roller 12 and the opposed roller 12*a*.

In this way, the image reading apparatus 92 repeats the above-mentioned reading operation with the original reading/conveying portion 93 and the reading portion unit 94 until the original presence/absence sensor 11 detects the absence of the original D.

What is claimed is:

1. An image reading apparatus comprising:
    a conveying rotary member;
    a biasing rotary member, which is in contact with said conveying rotary member, nips a sheet on which an image is formed, together with said conveying rotary member, and conveys the sheet along said conveying rotary member;
    an image sensor which reads the image on the sheet conveyed to an image reading position opposed to a lowermost point of said conveying rotary member; and
    a pair of pressing plates which are arranged on both sides in an axial direction of said conveying rotary member and presses the sheet against the image reading position, wherein a tread of said conveying rotary member and surfaces of said pressing plates opposed to said image sensor are colored white.

2. An image reading apparatus according to claim 1,
    wherein each of said pressing plates has a guide surface which guides the sheet.

3. An image reading apparatus according to claim 1,
    wherein each of said pressing plates is pressed against the image reading position by a spring.

4. An image reading apparatus according to claim 1,
    wherein said pressing plates are formed of an elastic member.

5. An image reading apparatus according to claim 1,
    wherein said biasing rotary member is disposed on an upstream side and another biasing rotary member is disposed at a downstream side of the image reading position.

6. An image reading apparatus according to claim 5,
    wherein said biasing rotary member on the upstream side of the image reading position has a diameter smaller than a diameter of said biasing rotary member on the downstream side of the image reading position.

7. An image reading apparatus according to claim 1, further comprising:
    a book-like original reading meachansim which includes a platen glass on which a book-like original is mounted, and a platen bringing the book-like original into close contact with said platen glass, and being capable of reading the book-like original as said image sensor moves under the platen glass.

8. An image reading apparatus according to claim 7,
    wherein said platen has a discharged sheet stacking portion, on which a sheet discharged by a discharge roller is stacked, on an upper surface thereof.

9. An image reading apparatus according to claim 1, further comprising:
    an original mounting stand on which a sheet having an image formed thereon is stacked;
    a pickup roller which feeds the sheet on said original mounting stand; and
    a separation unit which separates the sheets conveyed by pickup roller one by one.

10. An image reading apparatus according to claim 9,
    wherein said separation unit comprises a separation roller and a friction member which nip to separate the sheets one by one.

11. An image forming apparatus comprising:
    an image reading apparatus which reads an image formed on a sheet; and
    an image forming portion which forms the image read by said image reading apparatus on a sheet, wherein said image reading apparatus is the image reading apparatus according to any one of claims 1 and 2–10.

* * * * *

UNITED STATES PATENT AND TRADEMARK OFFICE
CERTIFICATE OF CORRECTION

PATENT NO. : 6,985,692 B2
APPLICATION NO. : 10/671617
DATED : January 10, 2006
INVENTOR(S) : Fumihiko Nakamura It is certified that error appears in the above-identified patent and that said Letters Patent is hereby corrected as shown below:

ON COVER PAGE AT (75) INVENTORS

"Fumihiko Nakamura, Tokyo (JP)" should read --Fumihiko Nakamura, Chiba (JP)--..

COLUMN 1

Line 51, "conveying" should read --conveys--.

COLUMN 6

Line 22, "pat" should read --path--.

COLUMN 8

Line 2, "plate" should read --plates--.

Signed and Sealed this

First Day of August, 2006

JON W. DUDAS
*Director of the United States Patent and Trademark Office*